United States Patent [19]
Marsolais

[11] Patent Number: 6,088,598
[45] Date of Patent: *Jul. 11, 2000

[54] METHOD AND SYSTEM FOR DISPLAYING GREETINGS IN A MOBILE RADIO COMMUNICATIONS SYSTEM

[75] Inventor: Patrice Marsolais, Joliette, Canada

[73] Assignee: Telefonaktiebolaget L M Ericsson, Stockholm, Sweden

[ * ] Notice: This patent is subject to a terminal disclaimer.

[21] Appl. No.: 08/768,314

[22] Filed: Dec. 17, 1996

[51] Int. Cl.[7] .................................................. H04Q 7/20
[52] U.S. Cl. ........................ 455/566; 455/414; 455/456
[58] Field of Search .................................. 455/414, 432, 455/433, 435, 456, 457, 566, 422

[56] References Cited

U.S. PATENT DOCUMENTS

| | | | |
|---|---|---|---|
| 5,255,307 | 10/1993 | Mizikovsky | 379/58 |
| 5,329,578 | 7/1994 | Brennan et al. | 455/414 |
| 5,428,665 | 6/1995 | Lantto | 455/433 |
| 5,577,103 | 11/1996 | Foti | 455/435 |
| 5,610,973 | 3/1997 | Comer | 455/432 |
| 5,625,680 | 4/1997 | Foladare et al. | 379/199 |
| 5,781,858 | 7/1998 | Lantto et al. | 455/414 |
| 5,812,950 | 9/1998 | Tom | 455/440 |
| 5,949,770 | 9/1999 | Liu et al. | 370/329 |
| 5,950,125 | 9/1999 | Buhrmann et al. | 455/422 |

FOREIGN PATENT DOCUMENTS 0 650 307   10/1994   European Pat. Off. .

WO 94/21075   9/1994   WIPO .

OTHER PUBLICATIONS

PCT Search Report, dated Sep. 16, 1998, PCT/SE 97/02112.

*Non–Public Mode Operation and Selection* (TDMA Forum) Version 2.0, Mar. 9, 1995.

*Primary Examiner*—Edward F. Urban
*Assistant Examiner*—Tilahun Gesesse
*Attorney, Agent, or Firm*—Jenkens & Gilchrist, P.C.

[57] ABSTRACT

There is disclosed a method and apparatus for displaying greetings to mobile terminals identifying services associated with location based services. The system identifies a plurality of service zones in the system, and also transmits predefined services to mobile terminals when located in the service zones. The system transmits from each base station local zone profile information to each of the mobile terminals located in those service zones. Each mobile terminal has stored therein subscriber zone profile information for which that mobile terminal can receive location based services. The mobile terminal also stores an associated greeting for each zone of subscriber zone profile information. The mobile terminal compares transmitted local zone information with the list of stored subscriber zone profile information, and when a match is found, the mobile terminal displays the greeting associated with the subscriber zone profile information. By storing the associated greeting in the mobile terminal, the otherwise signaling of greeting information over the air interface is avoided.

51 Claims, 4 Drawing Sheets

| POSITION | PSID NO. | GREETING |
|---|---|---|
| 1 | 10 | HOME |
| 2 | 6 | OFFICE |
| 3 | 75 | DOWNTOWN |
| 4 | DEFAULT | OUT OF AREA |

| POSITION | PSID NO. | GREETING |
|---|---|---|
| 1 | 10 | HOME |
| 2 | 6 | OFFICE |
| 3 | 75 | DOWNTOWN |
| 4 | DEFAULT | OUT OF AREA |

METHOD AND SYSTEM FOR DISPLAYING GREETINGS IN A MOBILE RADIO COMMUNICATIONS SYSTEM

BACKGROUND OF THE INVENTION

1. Technical Field of the Invention

The present invention relates to mobile radio communications systems and in particular cellular telephone systems. More specifically, the present invention relates to a method and apparatus for providing greetings to mobile radio subscribers having services based on subscriber location.

2. Description of Related Art

While the present invention has application in mobile radio communications systems, such as, for example, Mobitex, CDPD, cellular systems and mobile satellite systems, the present invention is described throughout the disclosure in respect of cellular telecommunication systems.

The nature of the cellular telephone systems, wherein system users have little or no geographical restrictions on the locations from which they may place or receive calls, makes the determination of what services are available to the subscriber in different locations a more important feature. Services offered in a cellular system vary based on services already provided on wire-line telephone networks and also on factors such as which of several available cellular service providers carry the call and whether the subscriber is roaming outside its own service area. Because the subscriber is generally unaware of how the foregoing factors affect the instantaneous services available for each call, it is unlikely that the subscriber can make anything more than a guess as to the services available for the call.

As discussed in TDMA FORUM, "Implementation Guide: Non-Public Mode Operation and Selection in IS-136 Compliant Mobile Stations", dated Mar. 9, 1995 and herein incorporated by reference, there are currently steps being taken in the cellular industry to provide alpha numeric tags or greetings to a subscriber in a cellular telephone system. The greeting is an optional feature that allows a subscriber to receive an alphanumeric message identifying a service provided such as, for example, service zone identification and charging information. The greeting service is independent of tone notification.

There is a new provision proposed for location based services in cellular telecommunication systems wherein different services are provided to the subscriber depending on the location of the subscriber within the cellular telephone communications system. The location based services are provided by storing in the user's profile, within a home location register for the cellular telephone system, several service profiles for the user where each service profile is defined for a zone location where the user is located. While location based services forms no part of the present invention, the use of location based services increases the importance of the subscriber being made aware of the services associated with his or her present location within the cellular telecommunications system. While proposals have been made to transmit location based information to subscribers using short message services (SMS) each time the subscriber registers with a new service area, i.e. a service area where the subscriber obtains a different set of services based on the user profile for that area, this requires the telecommunications system in the switch or the home location register to maintain a slogan or text that is transmitted over the air interface to the subscriber each time he registers in a new service area. These greetings and slogans are lengthy messages which significantly increase the traffic over the air interface.

There is a need for a more efficient way to update the subscriber of the services available to the subscriber in that location and reduce the signaling load on the air interface.

SUMMARY OF THE INVENTION

The present invention is directed to a mobile radio communications system that provides a greeting to the subscriber advising the subscriber of the type of predefined services which are applicable to the subscriber at its current location. More specifically, the present invention is directed to reducing the signaling load over the air interface and in the network by storing in the mobile terminal a subscriber zone profile that comprises a listing of subscriber zone identifications and related greetings. A comparison is made of the subscriber zone profile with the local zone profile comprising service zone identifications. When there is a match of one service zone identification value, i.e. the subscriber zone identification corresponds to the transmitted service zone identification, the appropriate greeting is displayed by the mobile terminal. The local zone profile information is broadcasted by the system constantly and is considerably shorter in information length than the actual greetings.

In accordance with one aspect of the present invention there is provided a mobile terminal for use in a mobile radio communication system for displaying service greetings associated with predefined services available to the mobile terminal. The mobile terminal includes first means for receiving and storing in the mobile terminal subscriber zone profile information identifying predefined location dependent services available to the mobile terminal in the communication system. The terminal includes second means for receiving and storing in the mobile terminal a plurality of greetings associated with the subscriber zone profile information. Each greeting is associated with a location dependent service provided to the mobile terminal within the communication system. The terminal includes means for continuously receiving local zone profile information from the communication system as the mobile terminal moves within the communications system. Comparing means is provided for comparing local zone profile information with stored subscriber zone information to determine if the local zone profile information matches the stored subscriber zone profile information. Also, display means are provided for displaying the associated greeting of the stored subscriber zone profile information when the stored subscriber zone profile information matches the local zone profile information.

The relation between the greetings and the subscriber zone profile may be such that each greeting is specifically associated to one or more service zone identification values (value-to value relationship). Alternatively, the greetings may be associated to one or more positions in the listing of service zone identifications stored in the mobile terminal (value-to-position relationship)

The greetings may be stored in the mobile terminal by programming the greetings locally into the mobile terminal upon activation of the mobile terminal. Alternatively, the greetings may be downloaded to the mobile terminal over an air interface upon activation of the mobile terminal.

The subscriber zone profile may be programmed locally, or downloaded over the air interface into the mobile terminal upon activation of the mobile terminal. Alternatively, the subscriber zone profile stored in the mobile terminal may be downloaded to the mobile terminal over an air interface when the mobile terminal enters a new service region. This allows service zone identifications to be reused between service regions.

The mobile terminal may comprise a digital terminal adapted to receive the subscriber zone profile information over a digital control channel of a cellular telecommunication system. The local zone profile information may correspond to private system identities (PSID's) broadcasted by base stations of the cellular communications system. The stored subscriber zone profile information in the storing means preferably comprises a listing of a plurality of PSID's for which the mobile terminal is to receive location based services.

A service region preferably corresponds to a whole service area of a cellular operator in one country. Alternatively, a service region may correspond to a system area which is uniquely identified by a system identification (SID) broadcasted by each base station of the cellular communication network. This latter alternative can easily allow the reuse of the same PSID values within the network.

The greetings are preferably associated with one or more PSID values (value-to-value relationship). Alternatively, greetings may be related with the listing of stored PSID's in a value-to-position relationship. In either case, the greetings are customized to subscriber services for the mobile terminal.

The display means of the terminal preferably displays a default greeting when there is no PSID matches between the local zone profile and the subscriber zone profile.

The stored subscriber zone profile and associated greetings are preferably locally programmed, or downloaded over a digital control channel, into the mobile terminal during activation. Alternatively, the subscriber zone profile may be transmitted to the mobile terminal over a digital control channel of the cellular telecommunications system during registration.

In accordance with another aspect of the present invention there is provided a cellular communication system for providing greetings of predefined services to mobile terminals operating within the cellular communications system. The system includes means for identifying a plurality of service zones in the system and means for transmitting mobile terminal defined location based services to mobile terminals when located in the service zones. The system further includes means for transmitting local service zone profile information from each local service zone to each of the mobile terminals located in the local service zone. Each of the mobile terminals in the system includes:

means for receiving from the system local service zone profile information;

means for storing subscriber zone profile information and associated greetings indicative of the services available to the mobile terminal for the stored information;

comparing means for comparing received local service zone profile information with stored subscriber zone profile information to determine if the received local service zone profile information matches the stored subscriber zone profile information; and, display means for displaying a greeting associated with the stored subscriber zone profile information when the stored subscriber zone profile information matches the received local service zone profile.

In accordance with still yet another aspect of the present invention there is provided a method for displaying service greetings, associated with location based services, on a display of a mobile terminal in a mobile radio communication system, the method comprising the steps of:

storing in the mobile terminal subscriber zone profile information and associated greetings indicative of the services available to the mobile terminal for the stored zone profile information;

receiving in the mobile terminal from the system local zone profile information for which the mobile terminal receives associated predefined services from the cellular system;

comparing received local zone profile information with stored zone profile information to determine if the received local zone profile matches the stored zone profile information; and, displaying a greeting associated with the stored zone profile information when the stored information matches the local zone profile information.

BRIEF DESCRIPTION OF THE DRAWINGS

A more complete understanding of the method and apparatus of the present invention may be obtained by reference to the following detailed description when taken in conjunction with the accompanying drawings wherein.

DETAILED DESCRIPTION OF EMBODIMENTS

Figure 1:
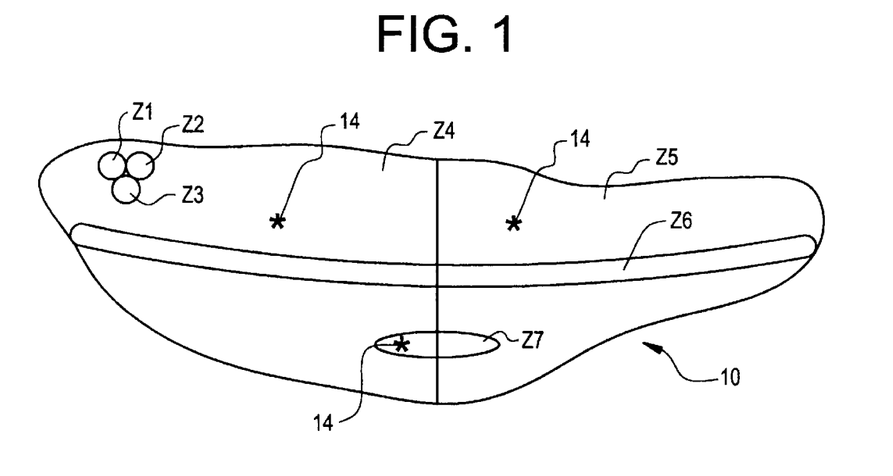
FIG. 1 illustrates the subdivision of a portion of a cellular coverage area to include a plurality of service zones in the cellular system of the present invention.

While the present invention has application in mobile radio communications, it more specifically relates to cellular telecommunication. Referring now to FIG. 1, there is shown an arbitrary geographic area 10 wherein a service area for a cellular communication system is provided to a plurality of mobile terminals 14 by at least one service provider. The cellular service area 10 is subdivided to include a plurality of service zones Z1, Z2, Z3, Z4, Z5, Z6, and Z7 (or Z1 to Z7), wherein one service zone may, but need not necessarily, be adjacent to, overlapping or contiguous with another service zone. For simplicity only seven zones Z1 to Z7 are shown. Furthermore, some portions of the area 10, although included for purposes of providing cellular communications coverage, may not be included within any of the service zones Z1 to Z7. The cell and/or coverage area of each service zone Z1 to Z7 within the area 10 is preferably selected by the cellular service provider and is defined and identified in the mobile switching center (MSC) of the cellular system.

The service zones Z1 to Z7 facilitate the provision of a special service that entitles mobile terminals 14 who participate in the service to have access to increased services provided the calls occur when the mobile terminal is located within an authorized one of the predefined service zones Z1 to Z7. These services are transmitted to the mobile terminals 14 by a radio base station (BS) and the MSC. It should be recognized that each mobile terminal may be authorized to receive the special service of one of the service zones Z1 to Z7 while simultaneously not be so authorized within another one of the service zones within the area 10. Calls occurring when the mobile terminal is located outside an authorized one of its service zones Z1 to Z7 may allow the mobile terminal to have access to conventional services. In accordance with the present invention a greeting is provided by the mobile terminal to inform the user of the service available in any given zone. The mobile terminal may have access to more than one service zone Z1 to Z7. For example, a mobile terminal could have multiple mobile terminal zone profiles to include 3 zones (home zone Z2, transportation corridor zone Z6 and office zone Z7).

The purpose of the system greetings by the mobile terminal 14 is to notify the user of the predefined services applicable to the mobile terminal in any given zone. The greeting is preferably stored in the form of text that is displayed on the mobile terminal's display. The greeting text is stored in the mobile terminal. It should be understood that a greeting may be defined for each of the geographical services zone Z1 to Z7. The greeting text in the mobile terminal is updated when the mobile goes for one service zone to another. This update occurs during zone changes in idle (non-speech) mode, hand-off events during speech mode, and at the start of each call.

In accordance with the predefined services, each participating mobile terminal may select for himself or herself subscriber zone profiles comprised of one or more provider defined service zones Z1 to Z7. Furthermore, more than one mobile terminal may share the same subscriber zone profile. The predefined service entitles participating mobile terminals to make and receive cellular telephone calls with special cellular services provided the calls occur when the mobile terminal is located within one of the service zones Z1 to Z7 selected by the mobile terminal for inclusion within its subscriber zone profiles.

The services provided in each subscriber zone profile may comprise anyone of the following services which is not an exhaustive list. The services relating to charging areas where various rates may be used in different locations. Services of private numbering, fraud prevention, distinctive alerting wherein the telephone may ring in accordance with different patterns depending on the type of call being received, system name greeting, selective call barring and fixed cellular where the user is restricted to having service in a fixed zone. Another location based service may include access to "IN" (intelligent network) services on an originating call.

Figure 2:
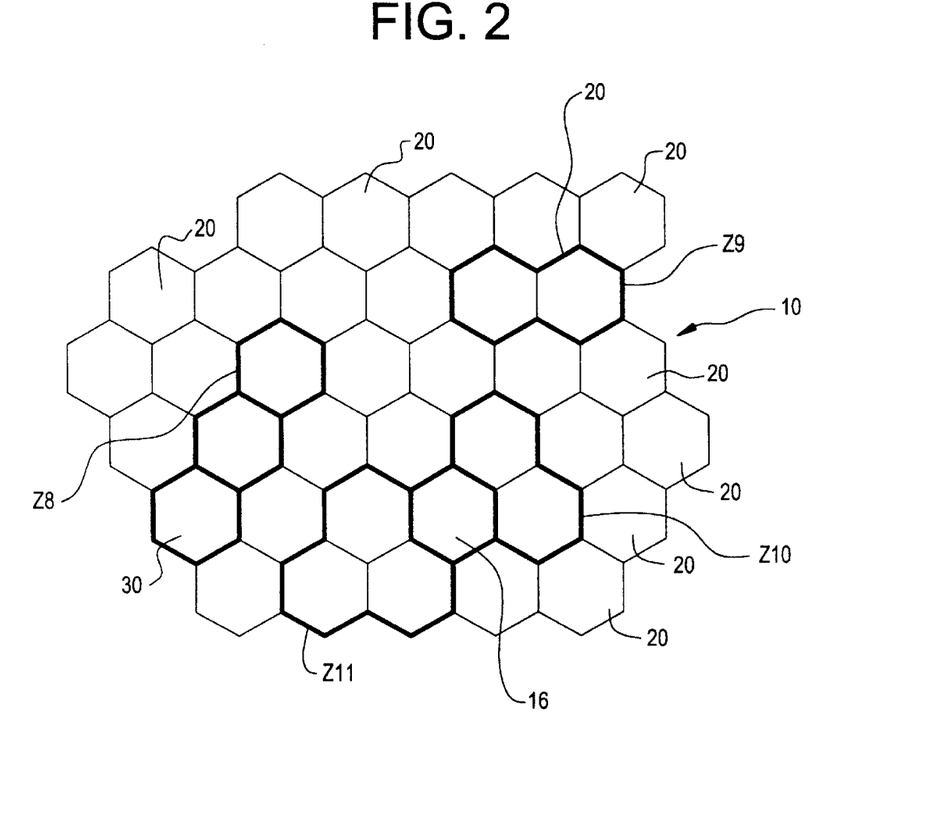
FIG. 2 illustrates the relationship between cells and service zones in the cellular system of the present invention.

Reference is now made to FIG. 2 wherein a small portion of the cellular coverage area 10 is shown to be comprised of a plurality of cells 20 (represented by hexagons). An exemplary plurality of service zones Z8 to Z11 (outlined in bold lines to ease recognition) are shown in the area 10. Zones Z9 to Z1 are defined by the service provider to set out geographical areas where predefined services are provided. Each service zone Z8 to Z11 includes one or more of the cells 20, and a cell in the area 10 may reside in one, more than one, or none of the service zones Z8 to Z11. A subscriber zone profile is assembled from the service zones Z8 to Z11.

The cells 20 spread throughout the cellular service area 10 may be serviced by different cellular service providers. However, the service zones Z8 to Z11 preferably include cells 20 serviced by one service provider. Thus, in general, it should be recognized that the predefined services provided are flexible in their implementation, and not restricted to provision by one service provider or by multiple uncooperative providers or within the coverage responsibility of a single mobile switching center. Agreements between providers concerning the extent of service zones Z8 to Z11 and the special services available to participating mobile terminals, will facilitate the efficient offering of the service.

Figure 3:
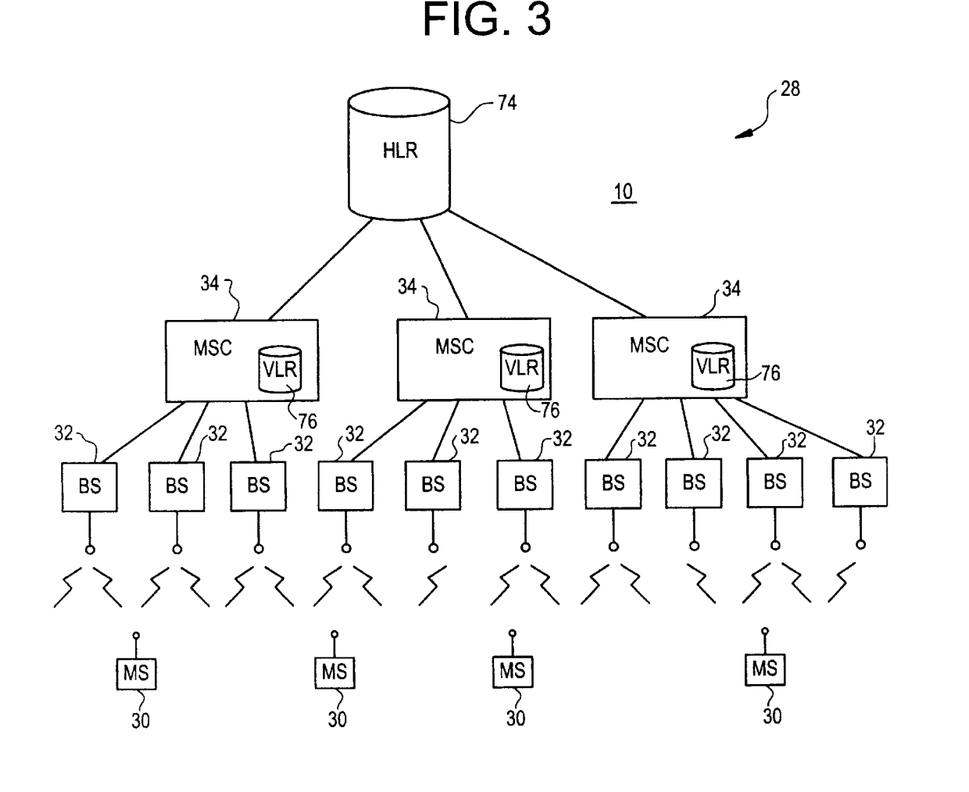
FIG. 3 is a block diagram illustrating the cellular communications system of the present invention.

Referring now to FIG. 3, cellular telephone service is provided within the cellular service area 10 by means of a cellular telephone system 28 comprising mobile stations (MS) 30, base stations (BS) 32, and at least one mobile switching center (MSC) 34. The mobile stations or terminals 30 are carried by each mobile terminal, and communicate with the base stations 32 in a manner well known to those skilled in the art by means of radio frequency communications links. Each base station 32 is located within a cell 20 (FIG. 2), and is connected to its associated mobile switching center 34 preferably through wire-lines or radio frequency links. The mobile switching centers 34 are connected to the public switched telephone network (PSTN) or other known communications network, and function to process and switch through the base stations 32 the cellular calls originated or received by the mobile terminals using the mobile stations 30. It will, of course, be understood that multiple mobile switching centers 34 may be needed to connect with the base stations 32 covering the area 10, and that the cells 20 in a service zone Z8 to Z11 for one mobile terminal zone profile may be served by different mobile switching centers 34. Furthermore, as discussed above, multiple service providers may be involved in offering the service to mobile terminals. To facilitate implementation of the predefined services, however, it is preferred that the cells 20 in any given service zone Z8 to Z11 be served by a single mobile switching center 34 and controlled by a single service provider.

Each of the cells 20 includes at least one base station 32 configured to facilitate communications with proximately located mobile stations 30. Although not shown in the drawings, the base stations 32 are typically positioned at or near the center of each of the cells. However, depending on geography and other known factors, the base stations 32 may instead be located at or near the periphery of, or otherwise away from the centers of, each of the cells. In such instances, the base stations 32 may broadcast and communicate with mobile stations 30 carried by mobile terminals who are located within the cells using directional rather than omnidirectional antennas. Each one of the base stations 32 includes a transmitter, a receiver, and a base station controller connected to the antenna in a manner and with a configuration well known in the art.

The special predefined service implemented by the cellular system 28 advantageously provides participating mobile terminals with services based on mobile terminal location. Mobile terminal location with respect to zone location is determined by which base station 32 (i.e., cell 20) is handling the mobile station 30 communications at the time the call is either originated, received or handed-off.

The service zones are globally defined in the HLR 74 and are locally translated into cells and private system identification numbers (PSID's) at the MSC 34. The local zone profile broadcasted in a cell comprises a listing of PSIDs depending on the number of service zones that the cell belongs to. This allows an MS 30 to know in which service zone it is on a continuous basis.

The subscriber zone profile is stored in the HLR 74 in the case of downloading the subscriber profile over the air interface at activation or registration. The subscriber zone profile is defined with respect to the service zones and are transmitted into cells and PSID's at the MSC 34.

This approach is based on the MS or terminal 30 storing the greetings. When the terminal is in a cell, the associated PSID list for that cell is broadcast. On acquiring this information, the terminal will compare the broadcast PSID list for that cell with the stored list associated with that terminal. Should there be a match, then the proper greeting is displayed, otherwise a default greeting is displayed.

Figure 4:
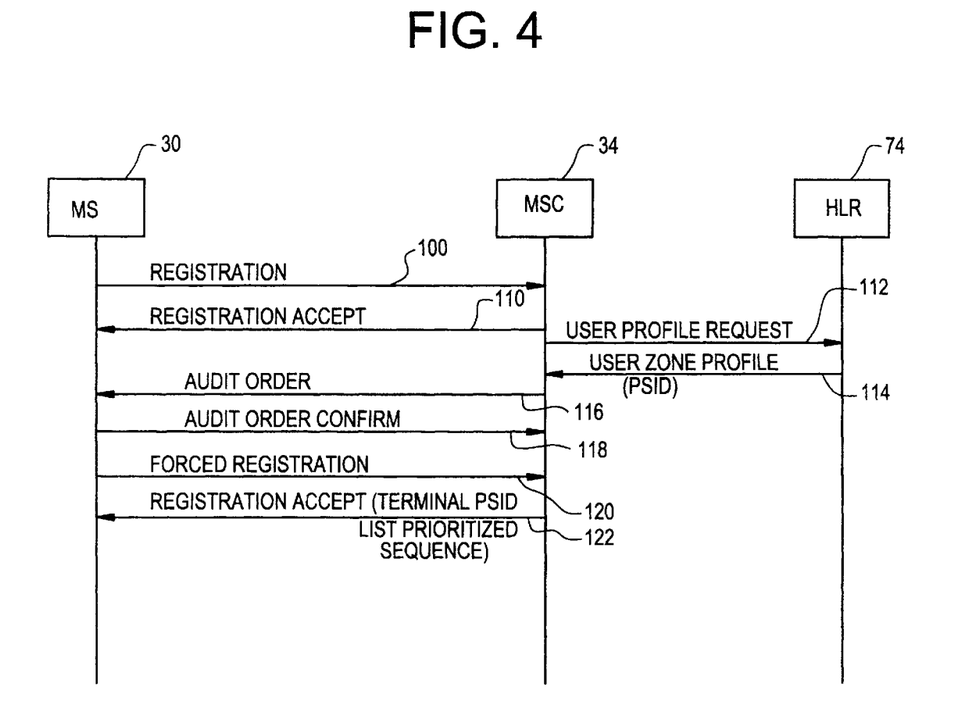
FIG. 4 are flow diagrams illustrating the message transfer within the cellular system of the present invention.

Referring to FIG. 4, there is shown a message diagram of how the zone information listing is transmitted in a specific sequence to the MS 30 at activation. When the MS 30 is powered on for the first time in the cellular system, it sends a registration request at line 100 to the MSC 34 via a local BS. The MSC then returns a registration accept message at 10 via an BS. Then the MSC sends a user profile request at 112 to the HLR 74. The HLR 74 then checks its records and determines a listing of service zone identifications and forwards this information in the form of subscriber zone information back at line 114 to the MSC. The MSC then provides an audit order at 116 to the MS 30 and the MS 30 confirms the audit order at line 118. This results in a forced registration from the MS 30 at line 120 to the MSC 34. The MSC 34 then sends back a registration accept message at 122 which includes the PSID listings as translated through the MSC from the HLR's subscriber zone profile. The list identifies cells per zone and each zone is transmitted in a specific order.

Accordingly, when an MS is powered on at activation it receives during the registration process a PSID listing in which it receives services. At all times, the BS for the cell 20 through which the MS is connected to the MSC broadcasts a local zone profile with its own list of PSID identifications. The MS or terminal compares the cell broadcast PSID listing with the PSID list received at activation or registration and stored in the MS. When there is a match between the two zone profiles, the terminal displays a message associated with the matching PSID value.

Figure 5:
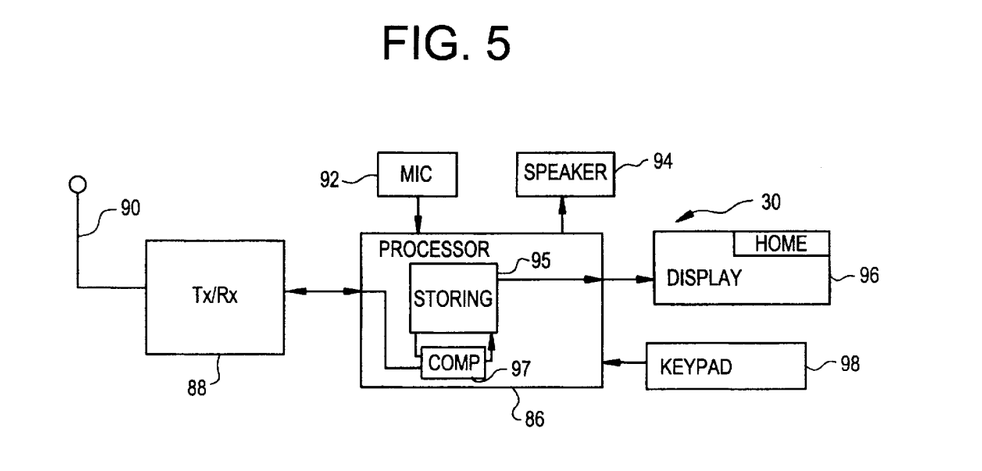
FIG. 5 is a simplified block diagram of a mobile terminal operable in the system of the present invention; and, FIG. 6 is a schematic diagram of how the PSID list and associated greeting are stored in the mobile terminal.

Referring now to FIG. 5, there is shown a simplified block diagram of the mobile station 30 including a processor 86 connected to a transceiver 88. An antenna 90 is connected to the transceiver 88 for transmitting and receiving digital communications over a cellular telephone network. The mobile station 30 further includes a microphone 92 and a speaker 94 connected to the processor 86 for facilitating telephonic voice communications. A display panel 96 and a keypad 98 are also included in the mobile station and connected to the processor 86. The MS 30 further includes memory or storing means 95 and comparing means 97. At activation or registration the PSID listings are transmitted from the MSC through an appropriate base station to the antenna 90 through transceiver 88 to the processor 86. The PSID listing is stored in the storing or memory 95. Further the idle mode or the data transfer communication mode of the mobile station 30, the PSID listing of a cell is broadcast to the mobile station at and received on antenna 90 through transceiver 88 and processed through a comparator 97 with the PSID list stored in memory 95. When there is a match, there is a display in the display 96 of a greeting. This greeting allows the user of the mobile station to understand the types of services that might be available to him in this particular location.

Figure 6:
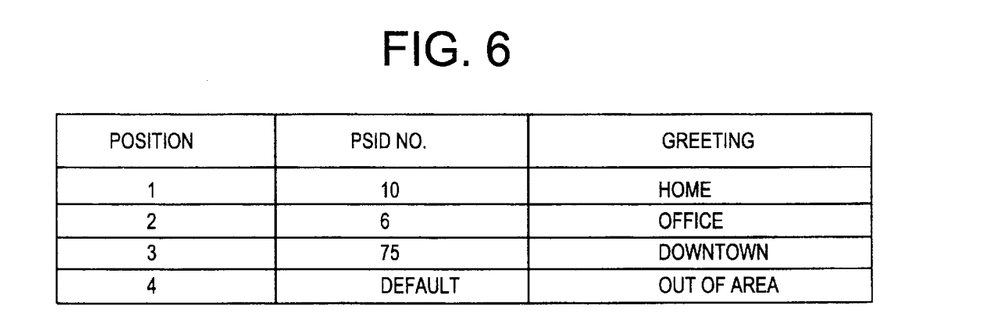

Referring to FIG. 6, there may be shown the type of information stored in the memory 95 of the MS 30. Under the column position there might be 4 rows of information wherein the second column the PSID number as shown 10, 6, 75 and default are located. The greeting associated with each PSID number would be shown to the right for 10 to be home for 6 to be office and for 75 to be downtown. The default greeting might be out of area. Hence, when a PSID number is broadcast from a cell which is 10 it would be matched with PSID listing 10 in the storage means 95 and the word home would be displayed on the display. If there was no match, the default greeting displayed would be out of area. The provision of allowing the greetings associated with the PSID's list numbers to be stored in the MS 30 reduces the signaling load on the system whereby the greeting does not have to be downloaded when a new PSID listing is transmitted by a base station. In such an event the mobile would have to make a request of its HLR to determine what would be the greeting associated with that new PSID number. While the preferred embodiment has shown that the initial greetings and PSID lists are forwarded once to the MS during activation, alternatively, during registration of the mobile the subscriber zone profile could be downloaded over the air interface into the memory of the telephone.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A mobile terminal for use in a mobile radio communication system for displaying service greetings associated with predefined services available to the mobile terminal, the mobile terminal including:

first means for receiving and storing in said mobile terminal subscriber zone profile information identifying predefined location dependent services available to said mobile terminal in said communication system;

second means for receiving and storing in said mobile terminal a plurality of greetings associated with said zone profile information, each greeting being associated with a location dependent service provided to the mobile terminal within the communication system;

means for continuously receiving local zone profile information from the communication system as said mobile terminal moves within said communications system;

comparing means for comparing local zone profile information with stored subscriber zone information to determine if the local zone profile information matches the stored subscriber zone profile information; and, display means for displaying the associated greeting of the stored subscriber zone profile information when the stored subscriber zone profile information matches the local zone profile information.

2. The mobile terminal of claim 1 wherein the greetings stored in said mobile terminal are associated to one or more service zone identification values of the subscriber zone profile stored in said mobile terminal.

3. The mobile terminal of claim 1 wherein the greetings stored in said mobile terminal are associated to one or more positions in the listing of service zone identification values of the subscriber zone profile stored in said mobile terminal.

4. The mobile terminal of claim 1 wherein the greetings stored in said mobile terminal are programmed locally into the mobile terminal upon activation of the mobile terminal.

5. The mobile terminal of claim 1 wherein the greetings stored in said mobile terminal are downloaded to said mobile terminal over an air interface upon activation of said mobile terminal.

6. The mobile terminal of claim 1 wherein the subscriber zone profile stored in said mobile terminal is programmed locally into the mobile terminal upon activation of the mobile terminal.

7. The mobile terminal of claim 1 wherein the subscriber zone profile stored in said mobile terminal is downloaded to said mobile terminal over an air interface upon activation of said mobile terminal.

8. The mobile terminal of claim 1 wherein the subscriber zone profile stored in said mobile terminal is downloaded to said mobile terminal over an air interface when the mobile terminal enters a new service region.

9. A mobile terminal for use in a cellular telecommunication system for displaying service greetings associated with predefined services available to the mobile terminal, the mobile terminal including:

first means for receiving and storing in said mobile terminal subscriber zone profile information identifying predefined location dependent services available to said mobile terminal in said cellular telecommunication system;

second means for receiving and storing in said mobile terminal a plurality of greetings associated with said zone profile information, each greeting being associated with a location dependent service provided to the mobile terminal within the cellular telecommunication system;

means for continuously receiving local zone profile information from the communication system as said mobile terminal moves within said cellular telecommunications system;

comparing means for comparing local zone profile information with stored subscriber zone profile information to determine if the local zone profile information matches the stored subscriber zone profile information; and, display means for displaying the associated greeting of the stored subscriber zone profile information when the stored subscriber zone profile information matches the local zone profile information.

10. The mobile terminal of claim 9 wherein the greetings stored in said mobile terminal are associated to one or more service zone identification values of the subscriber zone profile stored in said mobile terminal.

11. The mobile terminal of claim 9 wherein the greetings stored in said mobile terminal are associated to one or more positions in the listing of service zone identification values of the subscriber zone profile stored in said mobile terminal.

12. The mobile terminal of claim 9 wherein the greetings stored in said mobile terminal are programmed locally into the mobile terminal upon activation of the mobile terminal.

13. The mobile terminal of claim 9 wherein the greetings stored in said mobile terminal are downloaded to said mobile terminal over an air interface upon activation of said mobile terminal.

14. The mobile terminal of claim 9 wherein the cellular telecommunications system further includes a home location register (HLR) which stores said greetings and said greetings are downloaded from the HLR to the mobile terminal over an air interface upon activation of said mobile terminal.

15. The mobile terminal of claim 14 wherein the HLR stores global greetings that are downloaded to the mobile terminal via a serving mobile switching center (MSC) where the MSC translates the global greetings into local greetings.

16. The mobile terminal of claim 9 wherein the subscriber zone profile stored in said mobile terminal is programmed locally into the mobile terminal upon activation of the mobile terminal.

17. The mobile terminal of claim 9 wherein the subscriber zone profile stored in said mobile terminal is downloaded to said mobile terminal over an air interface upon activation of said mobile terminal.

18. The mobile terminal of claim 9 wherein the subscriber zone profile stored in said mobile terminal is downloaded to said mobile terminal over an air interface when the mobile terminal enters a new service region.

19. The mobile terminal of claim 9 wherein the cellular telecommunications system further includes a home location register (HLR) which stores said subscriber zone profile and said subscriber zone profile is downloaded from the HLR to the mobile terminal over an air interface upon activation of said mobile terminal.

20. The mobile terminal of claim 19 wherein the HLR stores a global subscriber zone profile that is downloaded to the mobile terminal via a serving mobile switching center (MSC) where the MSC translates the global subscriber zone profile into a local the subscriber zone profile.

21. The mobile terminal of claim 9 wherein the mobile terminal is a digital terminal adapted to receive the subscriber zone profile over a digital control channel of the telecommunication system.

22. The mobile terminal of claim 21 wherein received the subscriber zone profile corresponds to private system identities (PSID's) broadcasted by base stations of the cellular communications system.

23. The mobile terminal of claim 22 wherein the stored subscriber zone profile in the storing means comprises a listing of a plurality of PSID's for which the mobile terminal is to receive location based services.

24. The mobile terminal of claim 23 wherein the greeting associated with each stored PSID is customized to mobile terminal services for said mobile terminal.

25. The mobile terminal of claim 24 wherein the display means displays a default greeting when the received subscriber zone profile does not match stored information.

26. A cellular communication system for providing greetings of predefined services to mobile terminals operating within the cellular communications system, said system including:

means for identifying a plurality of service zones in the system;

means for transmitting mobile terminal defined location based services to mobile terminals when located in said service zones;

means for transmitting local service zone profile information from each local service zone to each of said mobile terminals located in said local service zone; and, each of said mobile terminals including:

means for receiving from said system subscriber local service zone profile information;

means for storing subscriber zone profile information and associated greetings indicative of the services available to the mobile terminal for the stored information;

comparing means for comparing received local service zone profile information with stored subscriber zone profile information to determine if the received local service zone profile information matches the stored subscriber zone profile information; and, display means for displaying a greeting associated with the stored subscriber zone profile information when the stored subscriber zone profile information matches the received local service zone profile.

27. The cellular communications system of claim 26 further including a plurality of cells and said means for identifying a plurality of service zones in the system further defining each of said zones to comprise at least one of the cells.

28. The cellular communications system of claim 27 wherein said means for identifying a plurality of service zones in the system comprises a mobile switching center (MSC).

29. The cellular communications system of claim 27 wherein the means for transmitting local service zone information is transmitted on a cell by cell basis.

30. The cellular communications system of claim 28 wherein the means for transmitting local service zone information comprises a base station electronically connected to said MSC, said base stations transmitting over a corresponding one of said cells the local service zone information associated with that cell.

31. The cellular communications system of claim 27 wherein the cell or cells included within each of said local service zones are selected by a provider of the cellular communications system.

32. The mobile terminal of claim 26 wherein the greetings stored in said mobile terminal are associated to one or more service zone identification values of the subscriber zone profile stored in said mobile terminal.

33. The mobile terminal of claim 26 wherein the greetings stored in said mobile terminal are associated to one or more positions in the listing of service zone identification values of the subscriber zone profile stored in said mobile terminal.

34. The mobile terminal of claim 26 wherein the greetings stored in said mobile terminal are programmed locally into the mobile terminal upon activation of the mobile terminal.

35. The mobile terminal of claim 26 wherein the greetings stored in said mobile terminal are downloaded to said mobile terminal over an air interface upon activation of said mobile terminal.

36. The mobile terminal of claim 26 wherein the cellular telecommunications system further includes a home location register (HLR) which stores said greetings and said greetings are downloaded from the HLR to the mobile terminal over an air interface upon activation of said mobile terminal.

37. The mobile terminal of claim 36 wherein the HLR stores global greetings that are downloaded to the mobile terminal via a serving mobile switching center (MSC) where the MSC translates the global greetings into local greetings.

38. The mobile terminal of claim 26 wherein the subscriber zone profile stored in said mobile terminal is programmed locally into the mobile terminal upon activation of the mobile terminal.

39. The mobile terminal of claim 26 wherein the subscriber zone profile stored in said mobile terminal is downloaded to said mobile terminal over an air interface upon activation of said mobile terminal.

40. The mobile terminal of claim 26 wherein the subscriber zone profile stored in said mobile terminal is downloaded to said mobile terminal over an air interface when the mobile terminal enters a new service region.

41. The mobile terminal of claim 26 wherein the cellular telecommunications system further includes a home location register (HLR) which stores said subscriber zone profile and said subscriber zone profile is downloaded from the HLR to the mobile terminal over an air interface upon activation of said mobile terminal.

42. The mobile terminal of claim 26 wherein the HLR stores a global subscriber zone profile that is downloaded to the mobile terminal via a serving mobile switching center (MSC) where the NISC translates the global subscriber zone profile into a local the subscriber zone profile.

43. A method for displaying service greetings, associated with location based services, on a display of a mobile terminal in a mobile radio communication system, said method comprising the steps of:

storing in said mobile terminal subscriber zone profile information and associated greetings indicative of the services available to the mobile terminal for the stored zone profile information;

receiving in said mobile terminal from said system local zone profile information for which the mobile terminal receives associated predefined services from the cellular system;

comparing received local zone profile information with stored zone profile information to determine if the received local zone profile matches the stored zone profile information; and, displaying a greeting associated with the stored zone profile information when the stored information matches the local zone profile information.

44. The mobile terminal of claim 43 wherein the association between the greetings and the subscriber zone profile stored in the mobile terminal is based on a value-to-value relationship.

45. The method of claim 43 where the association between the greetings and the subscriber zone profile stored in the mobile terminal is based on a value-to-position relationship.

46. The method of claim 43 where the step of storing subscriber zone profile information and associated greetings comprises locally programming said zone profile information and associated greetings to the mobile terminal during activation of the mobile terminal.

47. The method of claim 43 wherein the step of storing subscriber zone profile information and associated greetings comprises transmitting said subscriber profile information and associated greetings to the mobile terminal over an air interface during activation.

48. The method of claim 43 wherein the step of storing the greetings in the mobile terminal is performed during activation, and the step of storing subscriber zone profile information comprises transmitting said subscriber profile information to the mobile terminal over an air interface when the mobile terminal enters a new service region.

49. A mobile radio communication system for providing greetings of predefined services to mobile terminals operating within the communications system, said system including:

means for identifying a plurality of service zones in the system;

means for transmitting mobile terminal defined location based services to mobile terminals when located in said service zones;

means for transmitting local service zone profile information from each local service zone to each of said mobile terminals located in said local service zone; and, each of said mobile terminals including:

means for receiving from said system subscriber local service zone profile information;

means for storing subscriber zone profile information and associated greetings indicative of the services available to the mobile terminal for the stored information;

comparing means for comparing received local service zone profile information with stored subscriber zone profile information to determine if the received local service zone profile information matches the stored subscriber zone profile information; and, display means for displaying a greeting associated with the stored subscriber zone profile information when the stored subscriber zone profile information matches the received local service zone profile.

50. The mobile radio communications system of claim 49 wherein the greetings stored in said mobile terminal are associated to one or more service zone identification values of the subscriber zone profile stored in said mobile terminal.

51. The mobile radio communications system of claim 49 wherein the greetings stored in said mobile terminal are associated to one or more positions in the listing of service zone identification values of the subscriber zone profile stored in said mobile terminal.

* * * * *

UNITED STATES PATENT AND TRADEMARK OFFICE
CERTIFICATE OF CORRECTION

PATENT NO.   : 6,088,598
DATED        : July 11, 2000
INVENTOR(S)  : Patrice Marsolais Page 1 of 1

It is certified that error appears in the above-identified patent and that said Letters Patent is hereby corrected as shown below:

Column 7,
Line 14, replace "10" with -- 110 --

Column 12,
Line 1, replace "where the NISC" with -- where the MSC --

Signed and Sealed this

Nineteenth Day of March, 2002

Attest:

JAMES E. ROGAN
Attesting Officer    Director of the United States Patent and Trademark Office